Patented Aug. 2, 1927.

1,637,514

UNITED STATES PATENT OFFICE.

LINN BRADLEY, OF MONTCLAIR, NEW JERSEY, AND EDWARD P. McKEEFE, OF NEW YORK, N. Y.

PRODUCTION OF CAUSTIC ALKALI, ETC.

No Drawing. Application filed March 2, 1921, Serial No. 449,244. Renewed November 8, 1926.

This invention relates to the production of caustic alkali (caustic soda or caustic potash) from alkali-metal sulfates, as well as to the production of certain other alkali compounds, e. g., sulfites, from such sulfates.

Sodium and potassium sulfates and bisulfates cannot be directly causticized with lime for the commercial production of caustic soda or caustic potash. These sulfates are, however, utilized, according to the present invention, by an indirect method of treatment, for the production of the caustic alkalies, and also for the production of other alkali compounds, particularly sulfites.

According to the present invention, the alkali-metal sulfate is caused to react with an insoluble calcium salt, the acid radical of which forms an alkali-metal salt causticizible with lime, with the resulting production of a causticizible alkali-metal salt and calcium sulfate or gypsum. The reaction between sodium or potassium sulfate and such insoluble calcium salts will not take place merely by bringing a solution of the alkali-metal sulfate into contact with the insoluble calcium salt; but the reaction can be made to take place if an acid is present in amount sufficient to make the insoluble calcium salt more soluble in the acid solution than calcium sulfate.

Among such insoluble calcium salts, which may be made to react with the alkali-metal sulfates in the presence of free acid, may be mentioned tricalcium phosphate, dicalcium phosphate, calcium sulfite, calcium oxalate and calcium fluoride. Such insoluble calcium salts are advantageously used as freshly precipitated salts, and the process can, with advantage, be carried out in a cyclic manner, as hereinafter more fully set forth. If insoluble tricalcium phosphate is used, a sufficient amount of acid must be added to convert the tricalcium phosphate into dicalcium phosphate, and a small excess beyond this amount, before the reaction of the calcium phosphate with the sodium or potassium sulfate will readily take place. If insoluble dicalcium phosphate is used, a similar excess of acid should be added. That is, the insoluble dicalcium phosphate will not readily react with a solution of sodium sulfate in the absence of an excess of acid, but this reaction will readily take place if a sufficient excess of acid is present, so that the dicalcium phosphate is made more soluble than calcium sulfate. The acid may, for example, be sulfuric or phosphoric acid in sufficient amount to give the necessary acidity to the solution to bring about the reaction. When a sufficient excess of acid is thus present, the calcium phosphate will react with the sodium sulfate to form calcium sulfate or gypsum and disodium phosphate or a mixture of disodium phosphate with some monosodium phosphate. Instead of using sulfuric or phosphoric acid to give the excess acidity, a sufficient amount of nitre-cake or acid sodium sulfate may be used. The solution may be heated to accelerate the reaction.

Freshly precipitated calcium fluoride can be used in much the same manner as calcium phosphate. It will not react to an appreciable degree with sodium or potassium sulfate in the absence of acid, but it will readily react in the presence of warm water and a small quantity of free sulfuric acid or hydrofluoric acid, and the sodium or potassium sulfate can thus be readily converted into a more or less concentrated solution of sodium or potassium fluoride containing a small excess of free hydrofluoric acid, and leaving calcium sulfate in the form of gypsum as an insoluble precipitate.

Precipitated calcium sulfite can be used in a similar manner. When calcium sulfite or fluoride is used, only a small quantity of free acid is required to bring about the reaction of the calcium fluoride or sulfite with the sodium or potassium sulfate, to give the insoluble calcium sulfate or gypsum and a solution of sodium fluoride or sulfite together with a small amount of free acid.

When calcium phosphate is used, however, a somewhat larger amount of acid is required, in the case of tricalcium phosphate, as sufficient acid must be added not only to convert the tricalcium phosphate into dicalcium phosphate, but a sufficient excess to make the dicalcium phosphate more soluble than the calcium sulfate in the existing solution.

The solutions of alkali-metal salts produced as above described, i. e., the sodium or potassium phosphate, sulfite, or fluoride, are readily causticizible with lime, giving a solution of caustic soda or caustic potash and a precipitate of the insoluble calcium salt, i. e., calcium phosphate, calcium fluoride or calcium sulfite. The precipitated calcium salts thus produced can be used for the treatment of further amounts of alkali-metal sulfate solutions, in the presence of a sufficient excess of free acid, in the manner above described. That is, the insoluble calcium salt produced by the causticizing of the sodium salt or potassium salt solution with lime can be used for the treatment of further amounts of alkali-metal sulfate, so that the acid radical is alternately combined with fresh amounts of alkali-metal to form alkali-metal salts in solution and with further amounts of lime to form insoluble calcium salts; while the alkali-metals of the alkali-metal sulfates are first converted into alkali-metal salts with such acid radicals, and then into caustic alkali. The calcium introduced into the process as lime is first combined with such acid radicals and then changed into calcium sulfate which is removed from the cycle as gypsum.

The gypsum produced in the process forms one of the valuable products of the process. The gypsum obtained is white in color and of high purity.

The process is well adapted for use for the production of caustic potash from potassium sulfate, for example, by adding potassium sulfate to precipitated calcium fluoride in the presence of the right amount of hot water and a small quantity of free sulfuric acid or hydrofluoric acid. The reaction which takes place converts the potassium sulfate into a concentrated solution of potassium fluoride containing a small excess of free hydrofluoric acid, and leaves calcium sulfate precipitated as gypsum. This operation can be carried on very successfully in wooden tanks. The solution of potassium fluoride can then be causticized with lime or milk of lime or with other alkaline earth hydroxide, producing very high grade caustic potash from the sulfate, while the calcium or other alkaline earth fluoride produced during causticizing can be reused for treating another quantity of potassium sulfate. The calcium introduced as lime thus disappears from the plant in the form of high grade gypsum, and the potash introduced in the form of high grade potassium sulfate is converted into caustic potash of high purity and strength. Unconverted potassium sulfite may be separated from the caustic potash in any suitable manner.

The process of the present invention is also well adapted for use in the treatment of the salt-cake (normal sodium sulfate) or nitre-cake (acid sodium sulfate), or a mixture of both, for the production of caustic soda therefrom. The nitre-cake can thus be used to supply sufficient acid for giving the necessary acidity, for example, in the case of calcium phosphate, a sufficient excess of acid to convert the tricalcium phosphate into dicalcium phosphate and to give a sufficient excess to bring about the reaction. The sodium of the sodium sulfate or bisulfate will ultimately be recovered as caustic soda, while the sulfate radical will ultimately be separated as high grade gypsum.

The caustic alkali produced by the causticizing operation can be further concentrated, where the solution produced is not of sufficient concentration, or the caustic alkali can be converted into stick caustic or other solid form by the more or less complete removal of water therefrom, impurities being removed in the usual manner.

Instead of using calcium hydroxide or lime for causticizing the solution of causticizable alkali-metal salt, other alkaline-earth-metal hydroxide, such as barium hydroxide, for example, can be similarly used, and the barium obtained as insoluble barium salt. So also, other acid radicals than the radicals of phosphoric, hydrofluoric, or sulfurous acids may be used, which form a normal calcium salt less soluble than calcium hydroxide, and more soluble in the presence of a small amount of acid than calcium sulfate. Calcium sulfate is not soluble to any appreciable extent in a dilute acid such as is used in the process of the present invention, but the other calcium salts referred to, such as dicalcium phosphate, etc., are readily soluble in such a dilute acid solution, although such calcium salts will not readily react with sodium or potassium sulfate in the absence of a sufficient amount of the free acid.

When the solution of sodium sulfate is treated with calcium sulfite in the presence of an acid, there is produced a precipitate of gypsum or calcium sulfate and a solution containing sodium sulfite. This solution can be causticized, as above described, or it can be utilized for other purposes, for example, as a cooking liquor in the sulfite pulp process.

In producing a solution containing sodium sulfite, the solution of sodium sulfate may be subjected to the action of sulfurous acid in the presence of an alkaline-earth compound, such as calcium carbonate or calcium hydroxide, capable of reacting with a solution containing sulfurous acid and sodium sulfate to produce a precipitate of insoluble alkali-earth sulfate and a solution of sodium sulfite. That is, instead of using calcium sulfite, the calcium sulfite may be produced during the process by the action of sulfur dioxide or sulfurous acid upon calcium carbonate or other suitable compounds.

If an excess of calcium hydroxide or lime is used for causticizing a solution of sodium sulfite, there will remain, at the end of the operation, a mixture of calcium sulfite with the excess lime. Such a mixture can advantageously be employed for treating acid sodium sulfate or nitre-cake so that substantially all of the calcium will be converted into calcium sulfate, leaving in solution substantially all of the sodium as sodium sulfite in the presence of the excess uncombined acid.

It is not necessary to dissolve the sodium sulfate or acid sodium sulfate and to treat the resulting solution with calcium sulfite, or with sulfur dioxide and e. g. calcium carbonate, but the solid sodium sulfate or acid sulfate may have an insufficient amount of water added thereto to bring about complete solution, and the acid sulfate may then be made to react with calcium sulfite in the presence of an amount of water sufficient to permit the reaction to take place and in the presence of an excess of acid, which may be derived from the sodium acid sulfate, or which may be supplied in the form of sufficient sulfur dioxide to cause the reaction to take place. Neutral sodium sulfate may thus be made to react with calcium sulfite in the presence of sufficient water, without complete solution of the sodium sulfate, by treatment with a sufficient amount of sulfur dioxide, and with resulting production of sodium sulfite and calcium sulfate.

It will thus be seen that the present invention includes improvements in the manufacture of caustic alkali as well as improvements in the manufacture of other compounds, such as solutions of alkali-metal sulfites, mixtures of caustic soda and such alkali-metal sulfites, etc.

We claim:

1. The method of producing a solution of a causticizible alkali-metal salt, which comprises causing an alkali-metal sulfate to react with an insoluble calcium salt, the acid radical of which forms a causticizible alkali metal salt, in the presence of an amount of free acid not greatly in excess of the amount required to bring about the reaction, with resulting production of gypsum and a solution of the causticizible alkali-metal salt.

2. The method of producing caustic alkali, which comprises causing an alkali-metal sulfate to react with an insoluble calcium salt, the acid radical of which forms a causticizible alkali-metal salt, in the presence of an amount of free acid not greatly in excess of the amount required to bring about the reaction, with resulting production of gypsum and a solution of the causticizible alkali-metal salt, causticizing such solution with lime and thereby producing a solution of the caustic alkali and forming a precipitate of the insoluble calcium salt for reuse.

3. The method of producing caustic alkali which comprises causing a solution of alkali-metal sulfate to react with calcium sulfite in the presence of a small amount of free acid, thereby producing a solution of alkali-metal sulfite and a precipitate of gypsum, separating the precipitate, and causticizing the solution of alkali-metal sulfite to form a solution of caustic alkali and to give a precipitate of calcium sulfite available for reuse.

4. The method of producing caustic alkali which comprises causing a solution of an alkali-metal sulfate to react with an insoluble alkaline-earth sulfite in the presence of a small amount of free acid, thereby producing a solution of an alkali-metal sulfite and a precipitate of an alkaline-earth metal-sulfate, separating the precipitate, then causticizing the alkali-metal sulfite with an alkaline-earth metal-hydroxide, to form caustic alkali and to give a precipitate of an alkaline-earth metal-sulfite available for reuse.

5. The method of producing in solution an alkali-metal sulfite which comprises treating a solution containing an alkali-metal sulfate with sulfurous acid in the presence of a compound of an alkaline-earth metal capable of reacting with a solution containing sulfurous acid and an alkali-metal sulfate to produce a precipitate of an alkaline-earth metal sulfate.

6. The method of producing in solution an alkali-metal sulfite which comprises treating a solution containing an alkali-metal sulfate with sulfurous acid in the presence of a material containing a calcium compound.

7. The method of producing caustic soda in solution which comprises treating a solution containing a sufficient quantity of acid sodium sulfate with a material composed substantially of a mixture of calcium sulfite and calcium hydroxide so as to convert substantially all of the calcium into precipitated calcium sulfate and leave in solution substantially all of the sodium as sodium sulfite in the presence of uncombined acid, separating the precipitated calcium sulfate and causticizing the solution of sodium sulfite with an amount of calcium hydroxide in excess of that theoretically equivalent to the sodium sulfite.

8. The method of producing in solution an alkali-metal sulfite which comprises treating an alkali-metal sulfate and a material containing calcium sulfite with sufficient water and sulfur dioxide to convert substantially all of the alkali-metal compound into a solution of an alkali-metal sulfite and substantially all of the calcium into insoluble calcium sulfate.

9. The method of producing a solution containing sodium hydroxide and sodium sulfite which comprises treating a sulfate of sodium in the presence of water and uncombined sulfurous acid with a material containing a sulfite of calcium so as to produce a solution containing a sulfite of sodium and a precipitate of calcium sulfate, separating the insoluble matter and then treating the solution with lime so as to produce in solution sodium hydroxide and sodium sulfite and separating the solution from the insoluble matter.

10. The method of producing a solution containing a compound of an alkali-metal which is capable of being causticized with calcium hydroxide to produce caustic alkali in solution, which comprises treating an alkali-metal sulfate with a compound of calcium with an acid radical weaker than the sulfuric acid radical, in the presence of sufficient water and using sufficient free acid to convert substantially all of such calcium compound into calcium sulfate and to convert substantially all of the alkali-metal sulfate into a causticizable alkali-metal compound, and dissolving the latter compound in water.

11. The method of producing a solution containing an alkali-metal sulfite, which comprises treating an alkali-metal sulfate with a calcium sulfite in the presence of sufficient water and an amount of free acid not greatly in excess of the amount required to bring about the conversion of calcium sulfite into calcium sulfate and of alkali-metal sulfate into alkali-metal sulfite.

12. The method of producing a solution containing caustic alkali and alkali-metal sulfite which comprises treating sulfate of sodium with calcium sulfite in the presence of water with sulfurous acid in sufficient amount to bring about reaction and the formation of a precipitate of calcium sulfate and a solution containing sodium sulfite, and subjecting the resulting solution to partial causticization to convert part of the sodium sulfite into caustic soda.

13. The method of producing caustic soda in a solution which comprises treating a solution containing a sufficient quantity of acid sodium sulfate with a material composed substantially of a mixture of calcium hydroxide and a calcium salt capable of reacting with sodium sulfate to form a causticizible sodium salt so as to convert substantially all of the calcium into precipitated calcium sulfate and leave in solution substantially all of the sodium as a causticizible sodium salt in the presence of uncombined acid, separating the precipitated calcium sulfate and causticizing the solution of sodium salt with calcium hydroxide.

14. The method of producing caustic soda in a solution which comprises treating a solution containing a sufficient quantity of acid alkali-metal salt with a material composed substantially of a mixture of an alkaline-earth metal hydroxide and an alkaline-earth-metal salt capable of reacting with an alkali-metal sulfate to form a causticizible alkali-metal salt so as to convert substantially all of the alkaline-earth-metal into precipitated alkaline-earth-metal sulfate and leave in solution substantially all of the alkali metal as a causticizible alkali-metal salt in the presence of uncombined acid, separating the precipitated alkaline-earth-metal sulfate and causticizing the solution of alkali-metal salt with an alkaline-earth-metal hydroxide.

15. The method of producing in solution a causticizible alkali-metal salt which comprises treating a solution containing an alkali metal sulfate with an acid capable of forming causticizible sodium salts, in the presence of a compound of an alkaline-earth-metal capable of reacting with the above solution to produce a precipitate of an alkaline-earth-metal sulfate and a causticizible sodium salt.

16. The method of producing in solution causticizible alkali-metal salts, which comprises treating a plurality of insoluble calcium compounds, one of which is a calcium salt of an acid forming a causticizable alkali-metal salt, with an acid other than sulfuric acid in sufficient amount to convert the said calcium compounds into compounds more soluble in the acid liquor than calcium sulfate, and with a solution of an alkali-metal sulfate, to convert the calcium of said compounds into calcium sulfate and to form a causticizable alkali-metal salt solution.

In testimony whereof we affix our signatures.

LINN BRADLEY.
EDWARD P. McKEEFE.